2,898,365

PROCESS FOR MANUFACTURE OF ARENEBORONIC ACIDS

Robert M. Washburn, Whittier, and Charles F. Albright, West Covina, Calif., assignors to American Potash & Chemical Corporation, a corporation of Delaware No Drawing. Application December 5, 1956
Serial No. 626,276

7 Claims. (Cl. 260—462)

This invention relates to an improved process for the manufacture of areneboronic acids and the dimethyl esters thereof by the reaction of a suitable Grignard reagent and trimethyl borate.

The usual method of reacting a Grignard reagent is to add the other component slowly to a mass of the Grignard reagent. When this was practiced with a suitable borate ester such as trimethyl borate, the yield of the resulting product was very low, mainly due to the formation of side-reaction products. It was then proposed to overcome these difficulties by reverse addition of the Grignard reagent slowly to a mass of the borate ester and to employ a very low temperature, e.g., $-70$ to $-75°$ C. [Seaman and Johnson, J. Am. Chem. Soc. 53, 711 (1931); Bean and Johnson, J. Am. Chem. Soc. 54, 4415 (1932)]. It has become customary to use relatively dilute Grignard reagent (0.25 mole, 1.0 molar solution in ether), and add this slowly (45 minutes to several hours) to a dilute ethereal solution of the borate ester at a low temperature. Thereafter, hydrolysis with excess sulfuric acid is usually employed followed by purification procedures generally involving such steps as extraction with ether, distillation of the ether, precipitation of the boronic acid with aqueous potassium hydroxide, steam distillation of the alcohol in vacuo, acidification with sulfuric acid, redissolving the crude product in hot water, removal of impurities (brown oil containing diareneborinic acid) by filtration, decolorizing with carbon, precipitation and filtration. Yields of about 50–60% are thus obtained; the use of larger quantities and of more concentrated Grignard reagent reduces the yield to 42–47% of the theoretical quantity of product.

Furthermore, because of the low yields that have been reported when trimethyl borate is used, it has become common to use more readily purified higher borate esters, such as tri-n-butyl borate, as the boron source. Although the yield of product is thus improved, the higher esters carry much less boron into the reaction than trimethyl borate.

We have found that the manufacture of areneboronic acids can be simplified considerably and higher yields obtained if trimethyl borate and the Grignard reagent are added to a reaction zone simultaneously or alternately at such intervals as to maintain substantially stoichiometric proportions as required by the reaction:

$$ArMgX + (CH_3O)_3B \rightarrow ArB(OCH_3)_2 + Mg(OCH_3)X$$

In this reaction, ArMgX can be any aryl Grignard reagent, Ar can be any aromatic radical and X any halogen usual to a Grignard reagent. Trimethyl borate is particularly useful since it contains the most boron per unit of total weight of any borate ester and gives a larger yield of areneboronic acid than the n-butyl borate preferred by some. If any temporary excess of one reagent over the other is permitted, the trimethyl borate is that reagent and then only to a slight extent.

By observing these conditions we are able to obtain greatly improved yields at relatively elevated temperatures which are economically obtainable on a commercial scale in plant practice as compared to the low temperatures of about $-70°$ C. required heretofore. We prefer to operate between about $-60°$ C. and $+15°$ C. Utilizing these conditions also reduces the unit time required for reaction so that more product can be obtained from the same equipment; for example, instead of requiring several hours for reaction of 0.25 mole of a Grignard reagent at $-70°$ C., we are able to react 3.0 mole of the reagent with trimethyl borate in fifteen minutes at $0°$ C., in the same reactor, and obtain a better yield of a purer product requiring very little or no subsequent treatment.

The product, $ArB(OCH_3)_2$, which is the dimethyl ester of the areneboronic acid, can be collected and used as such or converted to the corresponding areneboronic acid by hydrolysis with water, then neutralization with a stoichiometric quantity of sulfuric acid in aqueous solution. Alternatively, it can be hydrolyzed and neutralized in one step by the addition of a stoichiometric quantity of a sulfuric acid solution. The ether layer is removed and the water layer further extracted with ether to remove all of the areneboronic acid. The ether and volatile impurities are removed from the combined ether extracts by codistillation with water or steam so as to maintain an aqueous layer. When all of the steam-volatile material has been removed, the aqueous distillation residue is allowed to cool, whereupon the product crystallizes. The solids are removed by filtration and generally require no further treatment other than a light petroleum ether wash and drying. Agitation during cooling may be employed to decrease the particle size and increase the efficiency of the final wash step.

It will be apparent, therefore, that by the practice of our invention it is now possible to prepare areneboronic acids or their dimethyl esters in high purity, in unusually high yields and with greater economy by the rapid and simple process described herein.

The practice of the invention will become further apparent from the following examples:

*Example 1.*—In a 5-liter Morton flask, equipped with a high-speed agitator, two pressure-compensated dropping funnels and a metal thermometer, and cooled with a Dry-Ice-acetone bath, benzeneboronic acid was prepared batchwise using stoichiometric quantities of reactants. All the apparatus was cleaned, dried and purged with dry argon for a sufficient time to replace the air and remove any residual moisture. Trimethyl borate (336 ml., 312 g., 3.0 moles) was distilled directly into the dropping funnel after removal of a forecut containing the methanol-trimethyl borate azeotrope. Anhydrous ether (1500 ml., sodium-dried) was added to the flask, using dry nitrogen for pressure transfer, and then cooled at $0°$ C. An ethereal solution of phenylmagnesium bromide (1000 ml., 3.0 moles) was pressure transferred into the second dropping funnel with dry nitrogen followed by anhydrous ether (200 ml.) used as a wash. The reactants were added incrementally to the rapidly agitated ether (8000 r.p.m.) adding first trimethyl borate (10 ml. increments), then phenylmagnesium bromide (30 ml. increments), so as to maintain a stoichiometric ratio with only a slight excess of methyl borate. A temperature of $0°$ C. was maintained with the Dry Ice-acetone bath during addition. All the reactants were added within a fifteen-minute period and the mixture was stirred for an additional twenty minutes before hydrolysis. The mixture was hydrolyzed by adding distilled water (200 ml., 11.1 moles) during five minutes maintaining a temperature of $0°$ C. The mixture was then neutralized with sulfuric acid (84 ml., 1.5 moles) in 1700 ml. of distilled water during a fifteen-minute period maintaining a temperature of $0°$ C. The stirring was stopped. The mixture separated into a yellow ether layer and a clear aqueous layer. The layers were separated and the water layer was extracted three times with 250 ml. portions of ether. The combined extracts and ether layer were transferred to a 5-liter flask, equipped with a Hershberg stirrer, modified Claisen head, dropping funnel, and heated with a mantle. A portion of the agitated ether was removed by flash distillation and then distilled water (1500 ml.) was added slowly to the distillation flask as the distillation proceeded. Distillation was continued until the head temperature reached 100° C. During this time a small quantity of biphenyl collected in the condenser. After the distillation had been completed, the stirrer was stopped and the aqueous distillation residue was allowed to stand for a sufficient length of time for any oil present to separate. Only trace amounts of oil were detected. Stirring was then continued and the solution cooled rapidly with an ice bath. Benzeneboronic acid crystallized from the water at a temperature of 43° C., resulting in a temperature rise to 45° C. Stirring was continued until the mixture had cooled to 11° C. and then the solids were removed by filtration and air dried. The resulting product, benzeneboronic acid, was a fine white crystalline powder analyzing 8.80% boron (8.87% theory) and requiring no further treatment or wash. A yield of 245 g. was obtained. An analysis of the filtrate indicated 32 g. of the product had not been recovered from the mother liquor resulting in a total yield of 277 g. or 75.8%.

*Example 2.*—Using the materials, procedure and equipment described in Example 1, a series of experiments were conducted in which the reaction temperature was varied. The following table shows the high yields obtainable by our process.

| Reaction Temperature, ° C. | Percent Yield Benzeneboronic Acid |
| --- | --- |
| +15 | 48.7 |
| 0 | 75.8 |
| −15 | 85.6, 87.5 |
| −30 | 92.3 |
| −45 | 92.2 |
| −60 | 99.5 |

*Example 3.*—Using the procedure and equipment described in Example 1, trimethyl borate (28.4 ml., 0.25 mole) and p-chlorophenylmagnesium bromide (172.5 ml., 1.45 M, 0.25 mole) were caused to react at 0° C. during a 25 minute period. A yield of 31.8 g. (39.2 g. theory, 81.2%) of p-chlorobenzeneboronic acid (M.P. 260–270° C.), analyzing 7.01% boron (6.92% theory), was obtained.

*Example 4.*—Using the procedure and equipment described in Example 1, trimethyl borate (28.4 ml., 0.25 mole) and o-tolylmagnesium bromide (152.5 ml., 1.65 M, 0.25 mole) were caused to react at 0° C. during an eighteen minute period. A yield of 18.7 g. (36.0 g. theory, 52%) of o-tolueneboronic acid (M.P. 100–110° C.), analyzing 7.94% boron (7.96% theory), was obtained.

*Example 5.*—Using the same procedure and equipment described in Example 1, α-naphthaleneboronic acid was prepared by the reaction of trimethyl borate (28.4 ml., 0.25 mole) and an ether-benzene solution of α-naphthalenemagnesium bromide (365 ml., 0.685 M, 0.25 mole) at 0° C. during a sixteen minute period. A yield of 14.4 g. (38.5 g. theory, 37.5%) of α-napthaleneboronic acid (M.P. 193–194° C.), analyzing 7.33% boron (7.03% theory) was obtained.

*Example 6.*—Using the materials, procedure and equipment described in Example 1, dimethylbenzeneboronate was prepared by the reaction of trimethyl borate (56 ml., 0.5 mole) and phenylmagnesium bromide (156 ml., 3.2 N, 0.5 mole) at 0° C. during a fifteen minute period. The reaction mixture was partially hydrolyzed by the addition of distilled water (9.0 ml., 9.0 g., 0.5 mole), stirred for ten minutes and the ethereal solution removed by pressure filtration. Distillation of the ethereal solution (11 mm. Hg, head temp. 74° C.) gave 56.0 g. (74.7%) of dimethylbenzeneboronate analyzing 7.20% boron (7.21% B theory).

We claim:

1. A process comprising: forming a body of ether; rapidly agitating said body of ether whereby to form a reaction zone; forming separate bodies of trimethyl borate and an ethereal solution of an aryl Grignard reagent wherein said aryl radical is selected from the class consisting of naphthyl, phenyl and lower alkyl and chloro-substituted phenyl; simultaneously adding a stream of said trimethyl borate and a stream of said ethereal solution of said Grignard reagent to said zone, the addition of said reactants being carried out at such a rate that stoichiometric quantities of said reactants are provided at all times to substantially completely react each of said reagents one with the other, whereby to form a dimethyl ester of an areneboronic acid; and throughout the period of reaction maintaining the temperature of the reaction zone at between about −60° C. and about +15° C.

2. The process of claim 1 wherein water is added to the reaction zone after the formation of said dimethyl ester of an areneboronic acid, whereby to hydrolyze said ester to an areneboronic acid.

3. The process of claim 1 wherein the dimethyl ester product so formed is hydrolyzed and neutralized by the addition thereto of a substantially stoichiometric quantity of sulfuric acid solution, whereby to form an areneboronic acid.

4. The process of claim 1 wherein said aryl Grignard reagent is phenylmagnesium bromide.

5. The process of claim 1 wherein said aryl Grignard reagent is p-chlorophenylmagnesium bromide.

6. The process of claim 1 wherein said aryl Grignard reagent is o-tolylmagnesium bromide.

7. The process of claim 1 wherein said aryl Grignard reagent is α-naphthalenemagnesium bromide.

References Cited in the file of this patent

Seaman et al.: "American Chem. Soc. Jour.," vol. 53 (1931), pp. 711–723 (only p. 714 relied on).